US012628219B2

(12) United States Patent
Chu et al.

(10) Patent No.: US 12,628,219 B2
(45) Date of Patent: May 12, 2026

(54) DEVICE, SYSTEM, AND METHOD FOR MULTI-LINK (ML) RECONFIGURATION

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 1066 days.

(21) Appl. No.: 17/718,878

(22) Filed: Apr. 12, 2022

(65) Prior Publication Data

US 2022/0330366 A1     Oct. 13, 2022

Related U.S. Application Data

(60) Provisional application No. 63/173,845, filed on Apr. 12, 2021.

(51) Int. Cl.
H04W 76/15 (2018.01)

(52) U.S. Cl.
CPC .................................. H04W 76/15 (2018.02)

(58) Field of Classification Search
None
See application file for complete search history.

(56) References Cited

U.S. PATENT DOCUMENTS

| | | | | |
|---|---|---|---|---|
| 2018/0324888 | A1* | 11/2018 | Shi ........................ | H04W 76/27 |
| 2019/0215884 | A1* | 7/2019 | Patil .................... | H04W 74/004 |
| 2021/0014911 | A1* | 1/2021 | Patil ..................... | H04L 1/1621 |
| 2021/0274574 | A1* | 9/2021 | Ghosh ................... | H04W 48/12 |
| 2022/0124855 | A1* | 4/2022 | Hu ......................... | H04W 76/34 |
| 2022/0264429 | A1* | 8/2022 | Gan ..................... | H04W 52/028 |
| 2022/0287122 | A1* | 9/2022 | Wang ..................... | H04W 8/22 |
| 2022/0330366 | A1* | 10/2022 | Chu ..................... | H04W 28/082 |
| 2022/0346171 | A1* | 10/2022 | Lu ........................ | H04B 7/0617 |
| 2022/0418022 | A1* | 12/2022 | Kneckt ................. | H04W 36/06 |
| 2023/0071851 | A1* | 3/2023 | Gan ...................... | H04W 72/30 |
| 2023/0077351 | A1* | 3/2023 | Gan ...................... | H04W 76/11 |
| | | | | 370/328 |
| 2023/0126846 | A1* | 4/2023 | Ratnam ................. | H04W 84/12 |
| | | | | 370/311 |
| 2023/0145827 | A1* | 5/2023 | Gan ...................... | H04W 76/15 |
| 2023/0232315 | A1* | 7/2023 | Chitrakar .............. | H04W 48/16 |
| | | | | 370/329 |

(Continued)

OTHER PUBLICATIONS

Torab, Payam et al. "IEEE P802.11, Wireless LANs; Comment resolution for ML Reconfiguration", IEEE 802.11-21/534r0, Mar. 2021, 15 pgs.

*Primary Examiner* — Hassan A Phillips
*Assistant Examiner* — Gautam Sharma

(57)     ABSTRACT

A device, a system, and a method for Multi-Link (ML) reconfiguration are disclosed. In an embodiment, the device includes a processor configured to generate an ML Configuration Action frame to change a number of active links while maintaining frame exchanges on at least one established link, where the ML Configuration frame includes a Reconfiguration ML Information Element (IE) that defines operating capabilities of at least one associated link, and exchange frames according to the operating capabilities of the at least one associated link.

20 Claims, 10 Drawing Sheets

300

| ELEMENT ID 302 | LENGTH 304 | ELEMENT ID EXTENSION 306 | MULTI-LINK CONTROL 308 | COMMON INFO 310 | LINK INFO 312 |
|---|---|---|---|---|---|
| OCTETS: 1 | 1 | 1 | 2 | VARIABLE | VARIABLE |

(56)         References Cited

U.S. PATENT DOCUMENTS

| | | | |
|---|---|---|---|
| 2023/0247702 A1* | 8/2023 | Shafin | H04W 76/15 |
| 2023/0254920 A1* | 8/2023 | Kim | H04W 48/16 |
| | | | 370/329 |
| 2023/0262585 A1* | 8/2023 | Naik | H04W 48/16 |
| | | | 370/329 |
| 2023/0284290 A1* | 9/2023 | Lanante | H04W 74/085 |
| | | | 370/329 |
| 2023/0309167 A1* | 9/2023 | Shafin | H04W 76/16 |
| 2023/0379999 A1* | 11/2023 | Kim | H04B 7/0413 |
| 2024/0129866 A1* | 4/2024 | Ko | H04L 69/28 |

* cited by examiner

200

| ORDER | INFORMATION |
| --- | --- |
| 1 | CATEGORY |
| 2 | PROTECTED EHT ACTION |
| 3 | DIALOG TOKEN |
| 4 | MULTI-LINK |

| ELEMENT ID 302 | LENGTH 304 | ELEMENT ID EXTENSION 306 | MULTI-LINK CONTROL 308 | COMMON INFO 310 | LINK INFO 312 |
|---|---|---|---|---|---|
| 1 | 1 | 1 | 2 | VARIABLE | VARIABLE |

OCTETS:

500

| TYPE SUBFIELD VALUE | MULTI-LINK ELEMENT VARIANT NAME |
|---|---|
| 0 | BASIC (SEE 9.4.2.312.2 (BASIC MULTI-LINK ELEMENT(#6700))) |
| 1 | PROBE REQUEST (SEE 9.4.2.312.3 (PROBE REQUEST MULTI-LINK ELEMENTS(#6701))) |
| 2(#4659) | RECONFIGURATION (SEE 9.4.2.312.4 (RECONFIGURATION MULTI-LINK ELEMENTS(#4659))) |
| 3-7 | RESERVED |

FIG. 5

A MULTI-LINK DEVICE (MLD) TRANSMITS A MULTI-LINK (ML) CONFIGURATION ACTION FRAME TO CHANGE A NUMBER OF ACTIVE LINKS WHILE MAINTAINING FRAME EXCHANGES ON AT LEAST ONE ESTABLISHED LINK, WHERE THE ML CONFIGURATION FRAME INCLUDES A RECONFIGURATION ML INFORMATION ELEMENT (IE) THAT DEFINES OPERATING CAPABILITIES OF AT LEAST ONE ASSOCIATED LINK

902

THE MLD EXCHANGES FRAMES ACCORDING TO THE OPERATING CAPABILITIES OF THE AT LEAST ONE ASSOCIATED LINK

DEVICE, SYSTEM, AND METHOD FOR MULTI-LINK (ML) RECONFIGURATION

CROSS-REFERENCE TO RELATED APPLICATIONS

This application is entitled to the benefit of U.S. Provisional Patent Application Ser. No. 63/173,845, filed on Apr. 12, 2021, which is incorporated by reference herein.

BACKGROUND

In multi-link operations, wireless devices, e.g., multi-link devices (MLDs), can execute various wireless operations, such as coordinate some features or operations for devices in a multi-link operation via one or more links. As an example, an MLD may use a Reconfiguration Multi-Link (ML) Information Element (IE) of an ML Configuration Action frame (e.g., an ML Configuration Request/Response Action frame) to add, remove, and/or disable a link after establishing links with another MLD via multi-link association. However, conventional ML Configuration Action frames may not include fields that indicate whether an MLD's number of active links is changing, and/or that define operating capabilities of the MLD's associated links when the number of active links is changed.

SUMMARY

A device, a system, and a method for Multi-Link (ML) reconfiguration are disclosed. In an embodiment, the device includes a processor configured to generate an ML Configuration Action frame to change a number of active links while maintaining frame exchanges on at least one established link, where the ML Configuration frame includes a Reconfiguration ML Information Element (IE) that defines operating capabilities of at least one associated link, and exchange frames according to the operating capabilities of the at least one associated link.

In an embodiment, the ML Configuration Action frame is transmitted to a Multi-Link Device (MLD), and where the device and the MLD negotiate the number of active links.

In an embodiment, the Reconfiguration ML IE includes a Common Info field that indicates a field that describes a number of simultaneous active links if the number of simultaneous active links changes.

In an embodiment, the Reconfiguration ML IE includes a Per Link Info field of an added link, and where a non-Simultaneous Transmit and Receive (NSTR) Bitmap indicates whether the added link and the at least one established link are an NSTR pair.

In an embodiment, the Reconfiguration ML IE includes a Per Link Info field of the at least one established link, and where an NSTR Bitmap indicates whether the at least one established link and another link are an NSTR pair.

In an embodiment, the number of active links decreases, and where a Link Identification (ID) value of the at least one established link is not changed if a link with a smaller Link ID value is at least one of removed and disabled.

In an embodiment, the number of active links increases, and where a Link ID value of an added link is a smallest Link ID value that has not been allocated by the device.

In an embodiment, the Reconfiguration ML IE includes a Common Info field with at least one of an enhanced ML Single-Radio (eMLSR) capability announcement and an enhanced ML Multi-Radio (eMLMR) capability announcement.

In an embodiment, at least one of the enhanced eMLSR capability announcement and the enhanced eMLMR capability announcement indicate at least one of links that support at least one of an eMLSR mode and an eMLMR mode, a delay time of a radio switch, an Extremely High Throughput (EHT) Modulation and Coding Scheme (MCS) (EHT-MCS) supported by at least one of the eMLSR mode and the eMLMR mode, and a Number of spatial streams (Nss) supported by at least one of the eMLSR mode and the eMLMR mode.

In an embodiment, the number of active links decreases, and where the device announces disablement of a removed link for non-Access Point (non-AP) MLDs that do not support ML reconfiguration.

In an embodiment, the number of active links increases, and where the device announces enablement of an added link.

In an embodiment, the Reconfiguration ML IE includes a Max Basic Service Set Identifier (BSSID) (MaxBSSID) Indicator field, and where the device cannot add an Access Point (AP) in a link with a non-transmitted BSSID if the added AP increases a value of the MaxBSSID Indicator field.

In an embodiment, the Reconfiguration ML IE includes a MaxBSSID Indicator field, and where if the device adds an AP in a link with a non-transmitted BSSID that increases a value of the MaxBSSID Indicator field of a Multiple BSSID IE related to the non-transmitted BSSID, then another AP in another link affiliated with the device announces a Change Sequence for the link with the non-transmitted BSSID.

In an embodiment, the device includes an EHT AP that can announce a co-host AP set for at least one of a network allocation vector (NAV) operation and a spatial reuse operation.

In an embodiment, the Reconfiguration ML IE includes a Max Co-hosted BSSID Indicator field, and where the device cannot add an AP in a link with a BSSID if the added AP increases a value of the Max Co-hosted BSSID Indicator field.

In an embodiment, the Reconfiguration ML IE includes a Max Co-hosted BSSID Indicator field, and where if the device adds an AP in a link with a non-transmitted BSSID that increases a value of the Max Co-hosted BSSID Indicator field, then another AP in another link affiliated with the device announces a Change Sequence for the link with the non-transmitted BSSID.

In an embodiment, the number of active links increases, and where the Reconfiguration ML IE includes a field that indicates an added link.

In an embodiment, the number of active links decreases, and where the Reconfiguration ML IE includes a field that indicates at least one of a removed link and a disabled link.

A system for ML reconfiguration is also disclosed. In an embodiment, the system includes a first MLD, where the first MLD includes a processor configured to generate an ML Configuration Action frame to change a number of active links while maintaining frame exchanges on at least one established link, where the ML Configuration frame includes a Reconfiguration ML IE that defines operating capabilities of at least one associated link, and a radio configured to transmit the ML Configuration Action frame, and a second MLD, where the second MLD includes another radio configured to receive the ML Configuration action frame.

A method for ML reconfiguration is also disclosed. In an embodiment, the method includes transmitting, by an MLD, an ML Configuration Action frame to change a number of active links while maintaining frame exchanges on at least one established link, where the ML Configuration frame includes a Reconfiguration ML IE that defines operating capabilities of at least one associated link, and exchanging, by the MLD, frames according to the operating capabilities of the at least one associated link.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 2 is a table for a Multi-Link (ML) Configuration Request/Response frame Action field format.

FIG. 5 is a table for encoding a Type subfield.

FIG. 9 illustrates a flow diagram of a technique for ML reconfiguration in accordance with an embodiment of the invention.

Throughout the description, similar reference numbers may be used to identify similar elements.

DETAILED DESCRIPTION

Figure 1:
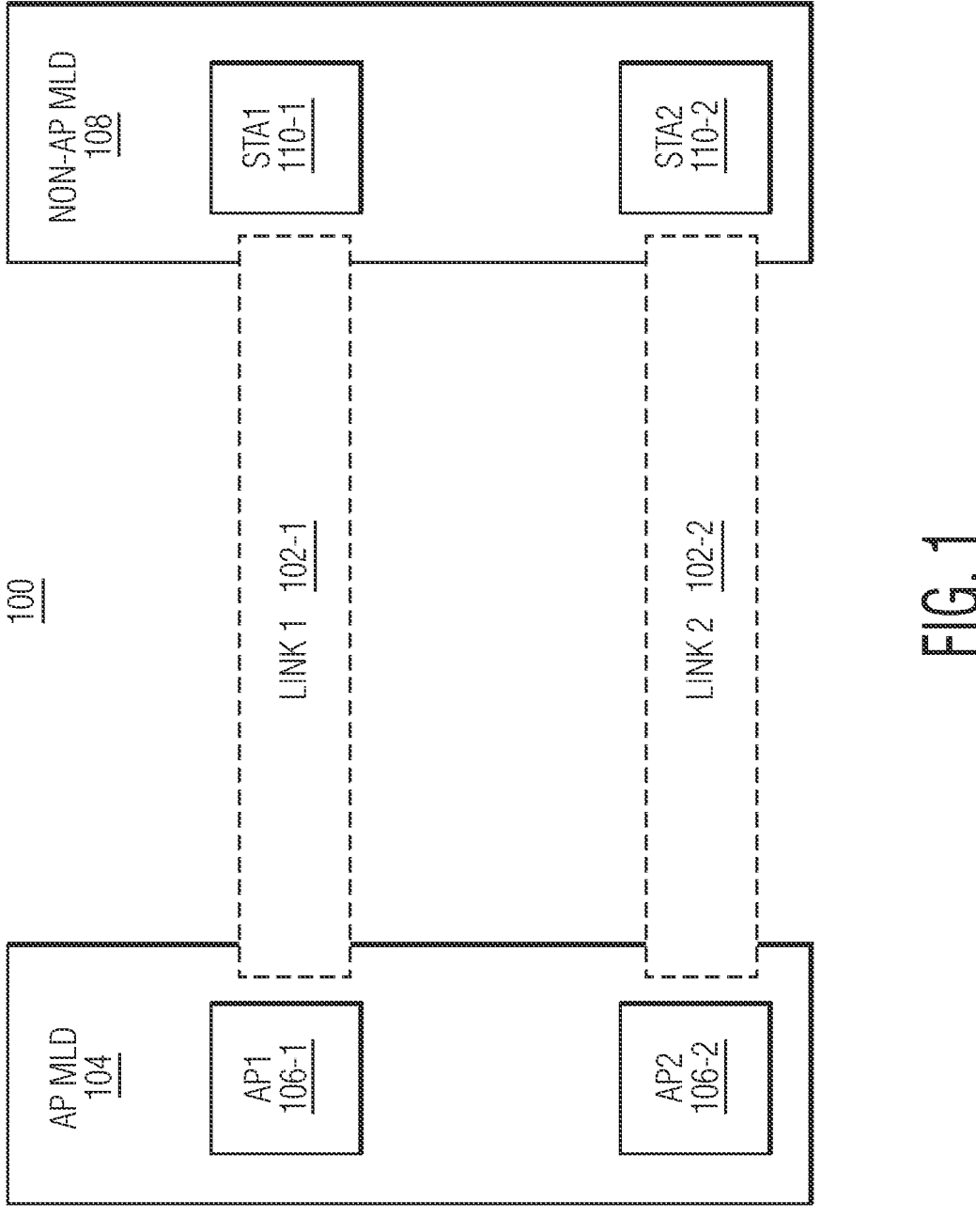
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a wireless device, e.g., an access point (AP) multi-link device (MLD) of a wireless local area network (WLAN) may exchange data with at least one associated non-Access Point (non-AP) MLD (e.g., a station (STA) MLD). In such an embodiment, the AP MLD may include one or more associated access points (APs) and the non-AP MLD may include one or more associated stations (STAs). The AP MLD may be configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communications systems operating in accordance with the EHT communication protocol and/or next-generation communication protocols may be referred to herein as "non-legacy" features. In some embodiments of the multi-link communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a multi-link communications system 100 that is used for wireless (e.g., Wi-Fi) communications. In the embodiment depicted in FIG. 1, the multi-link communications system includes one AP MLD, implemented as AP MLD 104, and one non-AP MLD (e.g., STA MLD), implemented as non-AP MLD 108. In an embodiment, the AP MLD 104 may be a first MLD, and the non-AP MLD 108 may be a second MLD. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communica-tions system may include fewer or more components to implement the same, less, or more functionality. For example, in some embodiments, the multi-link communications system includes a single AP MLD with multiple non-AP MLDs, or multiple AP MLDs with more than one non-AP MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two radios, AP1 106-1 and AP2 106-2. In some embodiments, a common part of the AP MLD 104 implements upper layer Media Access Control (MAC) functionalities (e.g., beacon creation, MLD association establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 may be wireless APs compatible with at least one WLAN communications protocol (e.g., at least one IEEE 802.11 protocol). For example, the APs 106-1 and 106-2 may be wireless APs compatible with the IEEE 802.11be protocol.

In some embodiments, an AP MLD (e.g., AP MLD 104) connects to a local area network (e.g., a Local Area Network (LAN)) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 megahertz (MHz) BSS operating channel at 6 gigahertz (GHz) band and AP2 106-2 may operate in a 160 MHz BSS operating channel at 5 GHz band. Although the AP MLD 104 is shown in FIG. 1 as including two APs, other embodiments of the AP MLD 104 may include more than two APs or less than two APs.

In the embodiment depicted in FIG. 1, the non-AP MLD, implemented as non-AP MLD 108, includes two radios (e.g., non-AP STAs), STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the STAs 110-1 and 110-2 are part of the non-AP MLD 108, such that the non-AP MLD may be a communications device that wirelessly connects to a wireless AP MLD. For example, the non-AP MLD 108 may be implemented in a laptop, a desktop personal computer (PC), a mobile phone, or other communications device that supports at least one WLAN communications protocol. In some embodiments, the non- AP MLD 108 is a communications device compatible with at least one IEEE 802.11 protocol (e.g., the IEEE 802.11be protocol). In some embodiments, the non-AP MLD 108 implements a common MAC data service interface and the STAs 110-1 and 110-2 implement a lower layer MAC data service interface.

In some embodiments, the AP MLD 104 and/or the non-AP MLD 108 can identify which communication links support multi-link operation during a multi-link operation setup phase and/or exchanges information regarding multi-link capabilities during the multi-link operation setup phase. In some embodiments, each of the STAs 110-1 and 110-2 of the non-AP MLD 108 may operate in a different frequency band. For example, STA1 110-1 may operate in the 2.4 GHz frequency band and STA2 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the non-AP MLD 108 communicates with the AP MLD 104 via two communication links, e.g., link 1 102-1 and link 2 102-2. For example, each of the STAs 110-1 or 110-2 communicates with AP1 106-1 or AP2 106-2 via corresponding communication links 102-1 or 102-2. In an embodiment, a communication link (e.g., link 1 102-1 or link 2 102-2) may include a BSS operating channel established by an AP (e.g., AP1 106-1 or AP2 106-2) that features multiple 20 MHz channels used to transmit frames in Physical Layer Convergence Protocol (PLCP) Protocol Data Units (PPDUs) (e.g., Date frames, Control frames, Management frames, Beacon frames, Action frames, etc.) between an AP MLD and a non-AP MLD. In some embodiments, a 20 MHz channel may be a punctured 20 MHz channel or an unpunctured 20 MHz channel. Although the non-AP MLD 108 is shown in FIG. 1 as including two STAs, other embodiments of the non-AP MLD 108 may include one STA or more than two STAs. In addition, although the AP MLD 104 communicates (e.g., wirelessly communicates) with the non-AP MLD 108 via multiple links 102-1 and 102-2, in other embodiments, the AP MLD 104 may communicate (e.g., wirelessly communicate) with the non-AP MLD 108 via more than two communication links or less than two communication links.

In some embodiments, MLDs (e.g., an AP MLD and a non-AP MLD) use multi-link association and multi-link disassociation to establish association and disassociation of multiple links through an Association Request, an Association Response, and/or a Disassociation. Multi-link association allows the MLDs to establish links to be used for communication between the devices. After the MLDs have established links via the multi-link association, the AP MLD and/or the non-AP MLD may add, remove, and/or disable a link via Multi-Link (ML) reconfiguration. Typically, a Reconfiguration ML Information Element (IE) may be included in an ML Configuration Action frame (e.g., an ML Configuration Request/Response Action frame) of an added link, a removed link, and/or a disabled link. However, conventional ML Configuration Request/Response Action frames may not include fields that indicate whether an MLD's number of active links is changing, and/or that define operating capabilities of the MLD's associated links when the number of active links is changed.

In accordance with an embodiment of the invention, a technique for ML reconfiguration involves transmitting, by an MLD, an ML Configuration Action frame to change a number of active links while maintaining frame exchanges on at least one established link, wherein the ML Configuration frame includes a Reconfiguration ML IE that defines operating capabilities of at least one associated link, and exchanging, by the MLD, frames according to the operating capabilities of the at least one associated link. Because the Reconfiguration ML IE defines operating capabilities of at least one associated link, links between devices may be reconfigured after multiple links have already been established. As such, by defining operating capabilities using the Reconfiguration ML IE, wireless operations and communications may be performed more efficiently.

A variety of links that may be referenced in accordance with various embodiments and/or examples are described herein. As described herein, an "established link" may be defined as a link that is established via multi-link association, and that is associated with an MLD (e.g., an AP MLD and/or a non-AP MLD). As described herein, an "associated link" may be defined as a link that is associated with an MLD, and that may or may not be being used for communication. As described herein, an "active link" may be defined as a link that is associated with an MLD, and that is being used for communication. As described herein, a "disabled link" may be defined as a link that is associated with an MLD, but is not being used for communication. As described herein, an "added link" may be defined as a link that was added, and that associates with an MLD after multi-link association. As described herein, a "removed link" (sometimes referred to as a "deleted link") may be defined as a link that was removed or deleted after multi-link association.

In some embodiments, when a number of active links changes, an ML Configuration Action frame (e.g., an ML Configuration Request/Response Action frame) may include a Reconfiguration ML IE with fields that define operating capabilities of at least one associated link, and that indicate whether a link was added, disabled, and/or removed. In an embodiment, an MLD (e.g., an AP MLD) transmits the ML Configuration Action frame to another MLD (e.g., a non-AP MLD), such that the AP MLD and the non-AP MLD negotiate the number of active links. An example of a table for an ML Configuration Request/Response Action frame field format is described in further detail with reference to FIG. 2. An example of a Reconfiguration ML IE and formats of Reconfiguration ML IE fields and subfields is described in further detail with reference to FIGS. 3-5.

FIG. 2 is a table, 200, for an ML Configuration Request/ Response Action frame field format. The table 200 includes a first column, "Order", and a second column, "Information". In an embodiment, an order of 1 corresponds to Category Information, an order of 2 corresponds to Protected EHT Action Information, an order of 3 corresponds to Dialog Token Information, and an order of 4 corresponds to Multi-Link Information.

Figure 3:
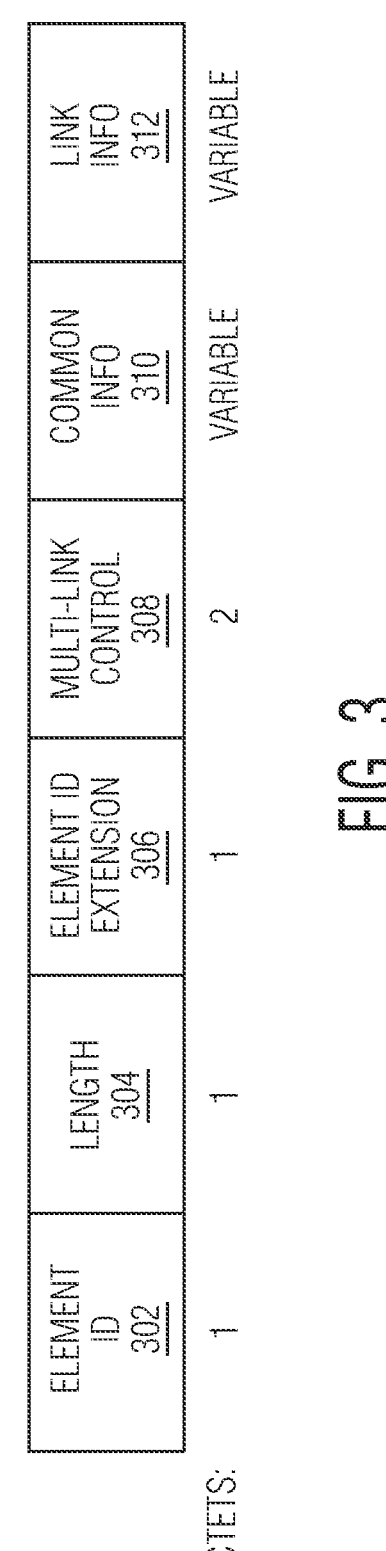
FIG. 3 depicts a Reconfiguration ML Information Element (IE).

FIG. 3 depicts a Reconfiguration ML IE 300. In the embodiment of FIG. 3, the Reconfiguration ML IE 300 includes six fields, implemented as an Element ID field 302 (1 octet), a Length field 304 (1 octet), an Element ID Extension field 306 (1 octet), a Multi-Link Control field 308 (2 octets), a Common Info field 310 (variable octets), and a Link Info field 312 (variable octets).

The Reconfiguration ML IE 300 may be in accordance with an 802.11be wireless protocol. Additionally, the Reconfiguration ML IE 300 may be used to recommend or request a reconfiguration operation for one or more non-AP STAs affiliated with a non-AP MLD. In some embodiments, a Common Info valid is not present in the Reconfiguration ML IE. In an embodiment, the Link Info field 312 is defined as the Link Info field for a Basic variant, and a Subelement ID field values for defined subelements are as shown in Table 9-322an (Optional subelement IDs for Reconfiguration variant Multi-Link element). In some embodiments, the Common Info field 310 of the Reconfiguration ML IE 300 indicates a field that describes a number of simultaneous active links if a number of simultaneous active links changes.

In an embodiment, when the number of active links increases, the Reconfiguration ML IE 300 includes a field (e.g., the Common Info field 310, the Link Info field 312, or another predetermined field) that indicates an added link. As an example, when a link is added to an MLD (e.g., an added link), a number of simultaneous active links (and radios) of the MLD may increase. A special scenario may be when the number of simultaneous active links of the MLD changes from one to two.

In another embodiment, when the number of active links decreases, the Reconfiguration ML IE 300 includes a field (e.g., the Common Info field 310, the Link Info field 312, or another predetermined field) that indicates a removed link or a disabled link. As an example, when a link is removed (or disabled) from an MLD, a number of simultaneous active links (and radios) of the MLD may decrease. A special scenario may be when the number of simultaneous active links of the MLD changes from two to one.

To address such changes to the number of simultaneous active links, the Common Info field 310 of the Reconfiguration ML IE 300 may need to include at least a subfield that describes a number of simultaneous active links. In an embodiment, a Reconfiguration ML IE includes a Common Info field that indicates a field that describes the number of simultaneous active links if the number of simultaneous active links changes. In another embodiment, the Common Info field may not carry the number of simultaneous active links if the number of simultaneous active links does not change.

In some embodiments, if a link is added, removed, or disabled, then an MLD's enhanced ML Single-Radio (eMLSR) support or enhanced ML Multi-Radio (eMLMR) support may be changed. For example, after a link is added (and the MLD's link number increases from one to two) or removed (and the MLD's link number decreases from two to one), the MLD may be changed to support eMLSR or eMLMR. As such, the Common Info field 310 of the Reconfiguration ML IE 300 may need to include an enhanced eMLSR capability announcement or an enhanced eMLMR capability announcement. The enhanced eMLSR capability announcement or the enhanced eMLMR capability announcement indicates, for example, links that support an eMLSR mode or an eMLMR mode, a delay time of a radio switch, an EHT Modulation and Coding Scheme (MCS) (EHT-MCS) supported by the eMLSR mode or the eMLMR mode, and a Number of spatial streams (Nss) supported by the eMLSR mode or the eMLMR mode. In some embodiments, when an MLD includes (only) one link (e.g., after removing other links), the MLD may still announce its eMLSR/eMLMR capabilities. In some embodiments, when a link is added, a link set that supports eMLSR/eMLMR mode may be changed (e.g., when the added link is added to the link set that supports the eMLSR/eMLMR mode).

Figure 4:
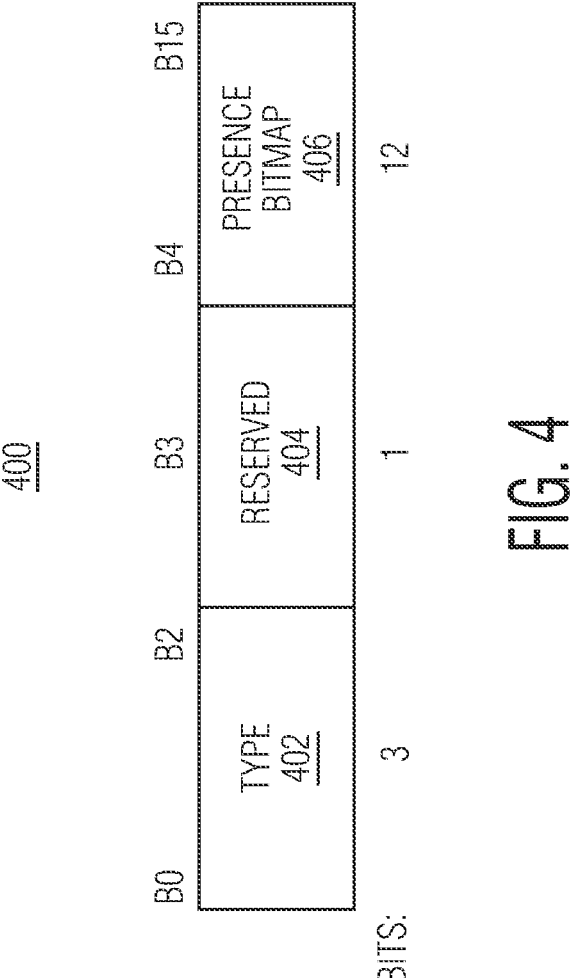
FIG. 4 depicts a Multi-Link Control field.

FIG. 4 depicts a Multi-Link Control field 400. The Multi-Link Control field 400 may represent the Multi-Link Control field 308 of the Reconfiguration ML IE 300. In the embodiment of FIG. 4, the Multi-Link Control field 400 includes three subfields, implemented as a Type subfield 402 that is three bits (B0 to B2), a Reserved subfield 404 that is one bit (B3), and a Presence Bitmap subfield 406 that is twelve bits (B4 to B15).

The Multi-Link Control field 400 may announce variants of ML Reconfiguration ML IEs through the Type subfield 402. In some embodiments, the subfields of the Multi-Link Control field 400 (except the Type subfield 402) are set to zero. In an embodiment, the Presence Bitmap subfield 406 may indicate which optional field may be present in a Common Info field (e.g., the Common Info field 310 of the Reconfiguration ML IE 300).

FIG. 5 is a table, 500, for encoding a Type subfield (e.g., the Type subfield 402 of the Multi-Link Control field 400). The table 500 includes a first column, "Type subfield value", and a second column, "Multi-Link element variant name". In an embodiment, a Type subfield value of 0 corresponds to a Basic Multi-Link element variant, a Type subfield value of 1 corresponds to a Probe Request Multi-Link element variant, a Type subfield value of 2 corresponds to a Reconfiguration Multi-Link element variant, and a Type subfield value of 3-7 corresponds to a Reserved Multi-Link element variant.

An example of a Per-STA Control field is described in further detail with reference to FIG. 6.

Figure 6:
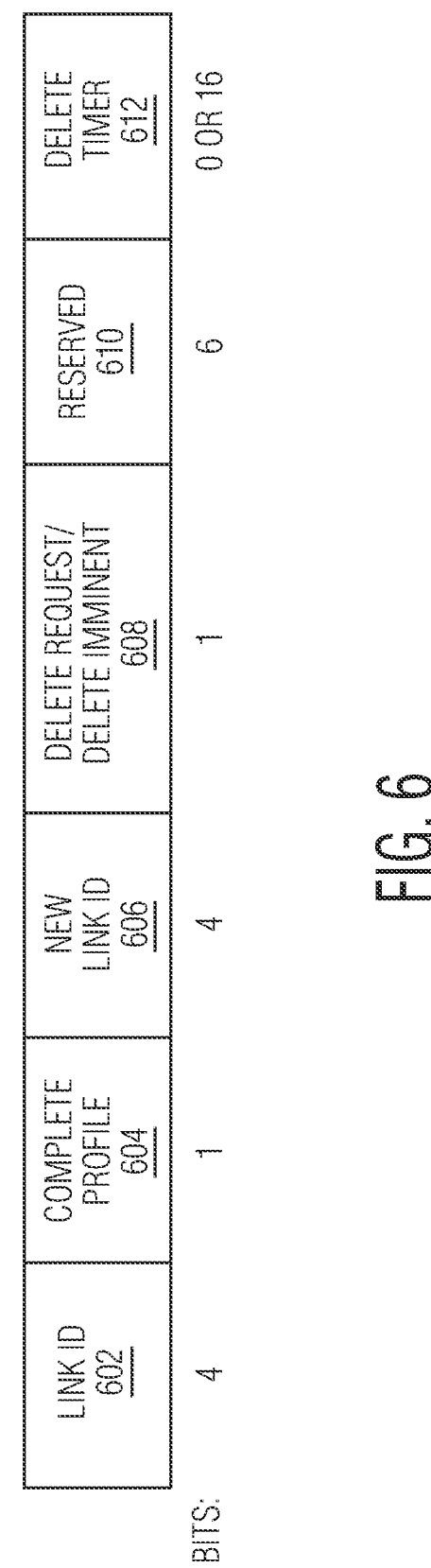
FIG. 6 depicts a Per-Station (STA) Control field.

FIG. 6 depicts a Per-STA Control field 600. In the embodiment of FIG. 6, the Per-STA Control field includes six subfields, implemented as a Link ID subfield 602 (4 bits), a Complete Profile subfield 604 (1 bit), a New Link ID subfield 606 (4 bits), a Delete Request/Delete Imminent subfield 608 (1 bit), a Reserved subfield 610 (6 bits), and a Delete Timer subfield 612 (0 or 16 bits). In an embodiment, a format of the Per-STA Control field 600 is as defined by Figure 9-788ek (Per-STA Control field format for Reconfiguration variant Multi-Link element).

An example of a Per-STA Profile subelement (sometimes referred to as a Per Link Info field) is described in further detail with reference to FIG. 7.

Figure 7:
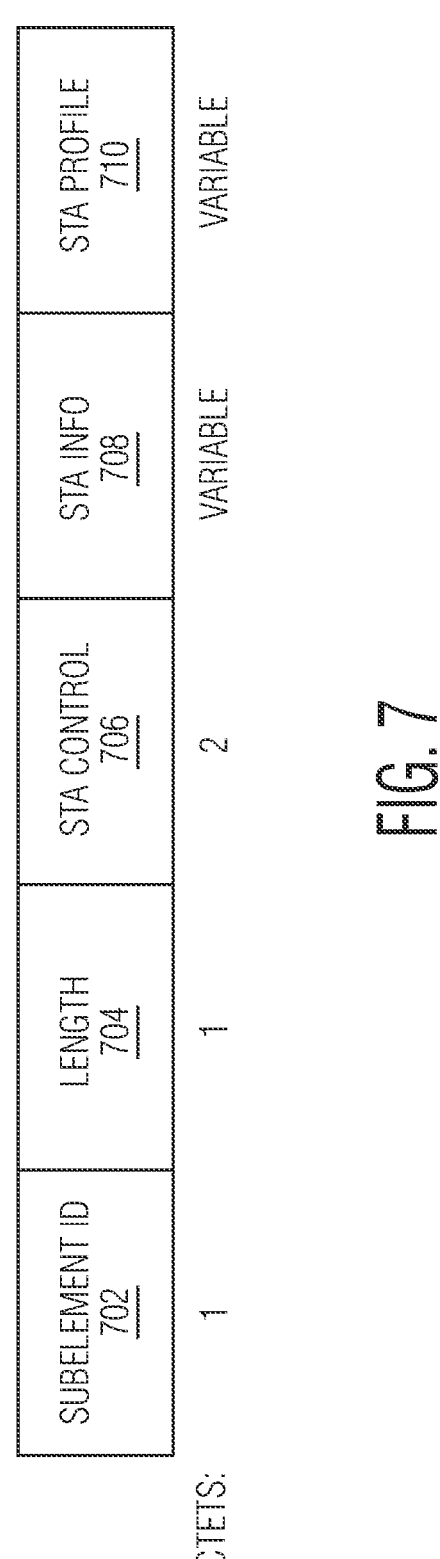
FIG. 7 depicts a Per-STA Profile subelement.

FIG. 7 depicts a Per-STA Profile subelement 700. The Per-STA Profile subelement 700 may be included in the Link Info field 312 of the Reconfiguration ML IE 300. In the embodiment of FIG. 7, the Per-STA Profile subelement 700 includes five fields implemented as a Subelement ID field 702 (1 octet), a Length field 704 (1 octet), an STA Control field 706 (2 octets), an STA Info field 708 (variable octets), and an STA Profile field 710 (variable octets). In an embodiment, the STA Control field 706 indicates which optional field will be present in the STA Info field 708. The Per-STA Profile subelement 700 (e.g., Per Link Info field) may be used to indicate links that are a non-Simultaneous Transmit and Receive (NSTR) pair.

In one embodiment, a Reconfiguration ML IE (e.g., Reconfiguration ML IE 300) includes a Per Link Info field of an added link, and an NSTR Bitmap indicates whether the added link and the at least one established link are an NSTR pair. The Per Link Info field may be needed if a number of simultaneous active links of the MLD is no less than two after adding a link, otherwise the Per Link Info field is not needed. In an embodiment, a change of the NSTR Bitmap of another MLD's associated link can be acquired through the Per Link Info field of the added link if the number of simultaneous active links of the MLD does not change from one to two. In another embodiment, the Per Link Info field of the other MLD's associated link may be carried in an Action frame related to the added link to announce the associated link's NSTR Bitmap.

In another embodiment, a Reconfiguration ML IE (e.g., Reconfiguration ML IE 300) includes a Per Link Info field of at least one established link, and an NSTR Bitmap indicates whether the at least one established link and another link are an NSTR pair. The Per Link Info field may be needed at least when a number of simultaneous active links of the MLD changes from one to two after adding a link. In an embodiment, one restriction may be that the Per Link Info field of an established link in a Reconfiguration ML IE (only) carries a Per STA Control field (e.g., for indicating existence of an NSTR Bitmap) and subfields related to the NSTR Bitmap (e.g., NSTR Bitmap Size subfield and NSTR Bitmap subfield).

In some embodiments, an AP MLD may choose Link ID values for its links, such that the Link ID values start at zero and increase sequentially. In one embodiment, if a number of active links decreases, then a Link ID value of the at least one established link is not changed if a link with a smaller Link ID value is removed or disabled. For example, if a link ID with a smaller Link ID value is removed, then the Link ID values of other links are not changed. Alternatively, the smaller Link ID value that has no affiliated AP can be used by another link with a biggest Link ID value. In another embodiment, if a number of active links increases, then a Link ID value of an added link is a smallest Link ID value that has not been allocated by the device. For example, if an AP MLD adds a new link (e.g., adds a new AP in the link), then a Link ID value of the added link will be selected from a smallest Link ID value that has not been allocated by the AP MLD. Alternatively, the smallest Link ID value that is not used by an affiliated AP when adding the new link can be used by the added link.

In some embodiments, a non-AP MLD may not support ML reconfiguration. When a number of active links decreases, a device (e.g., an AP MLD) announces disablement of a removed link for non-AP MLDs (e.g., STA MLDs) that do not support ML reconfiguration. For example, when an AP MLD removes one of its links, the AP MLD will announce the disablement of the link for the non-AP MLDs that do not support the MLD reconfiguration. In such an example, the non-AP MLDs that do not support the ML reconfiguration will not use the disabled link. Alternatively, when the number of active links increases, the device (e.g., the AP MLD) announces enablement of an added link. For example, when an AP MLD adds an additional link, the AP MLD will announce the enabling of the additional link. In such an example, non-AP MLDs that do not support ML reconfiguration and that received the announcement will enable the additional link and use the additional link again. In some embodiments, when an AP MLD does not support ML reconfiguration, an associated non-AP MLD may not be allowed to send an ML Request Action frame to the AP MLD.

An example of a Multiple BSSID IE is described in further detail with reference to FIG. 8.

Figure 8:
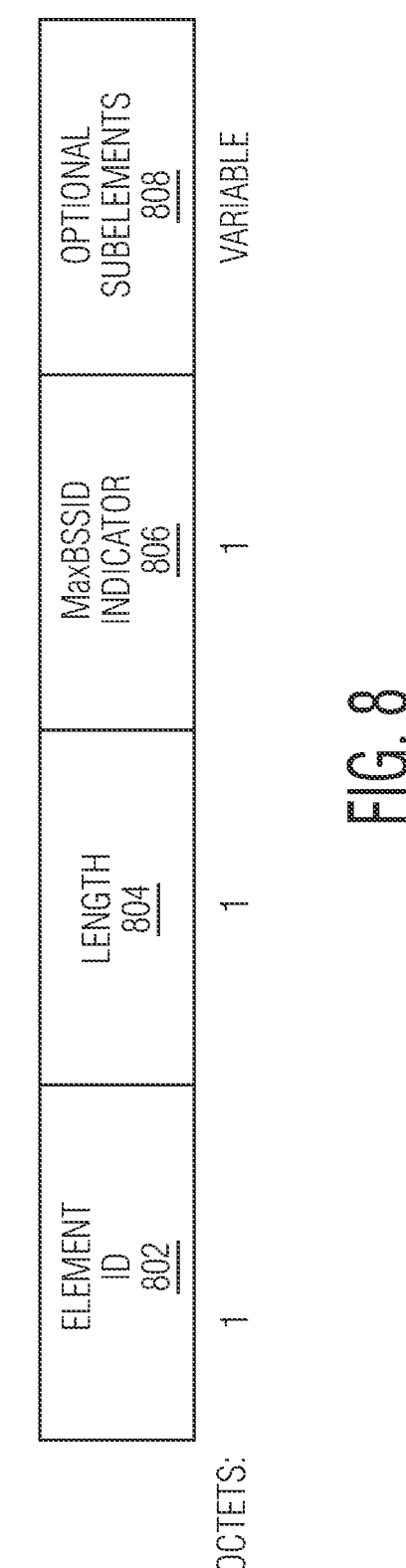
FIG. 8 depicts a Multiple Basic Service Set Identifier (BSSID) IE.

FIG. 8 depicts a Multiple BSSID IE 800. In the embodiment of FIG. 8, the Multiple BSSID IE 800 includes four fields, implemented as an Element ID field 802 (1 octet), a Length field 804 (1 octet), a Max BSSID (MaxBSSID) Indicator field 806 (1 octet), and an Optional Subelements field 808 (variable octets).

In one embodiment, a device (e.g., an AP MLD) cannot add an AP in a link with a non-transmitted BSSID if the added AP increases a value of a MaxBSSID Indicator field (e.g., the MaxBSSID Indicator field 806). In another embodiment, if the device adds an AP in a link with a non-transmitted BSSID that increases a value of the MaxBSSID Indicator field of a Multiple BSSID IE (e.g., Multiple BSSID IE 800) related to the non-transmitted BSSID, then another AP in another link affiliated with the device announces a Change Sequence for the link with the non-transmitted BSSID. In such an embodiment, non-AP STAs of a non-AP MLD in the link with the non-transmitted BSSID can acquire a MaxB SSID Indicator field change so that a correct network allocation vector (NAV) operation and a spatial reuse operation can be guaranteed.

In some embodiments, a device (e.g., an AP MLD) may include an EHT AP that can announce a co-host AP set for a NAV operation and a spatial reuse operation. In one embodiment, the device cannot add an AP in a link with a BSSID if the added AP increases a value of the Max Co-hosted BSSID Indicator field. In another embodiment, if the device adds an AP in a link with a non-transmitted BSSID that increases a value of the Max Co-hosted BSSID Indicator field, then another AP in another link affiliated with the device announces a Change Sequence for the link with the non-transmitted BSSID. In such an embodiment, non-AP STAs of non-AP MLDs in the link with the non-transmitted BSSID can acquire the Max Co-hosted BSSID Indicator field change so that a correct NAV operation and a spatial reuse operation can be guaranteed.

FIG. 9 illustrates a flow diagram of a technique for ML reconfiguration in accordance with an embodiment of the invention. At block 902, an MLD transmits an ML Configuration Action frame to change a number of active links while maintaining frame exchanges on at least one established link, where the ML Configuration frame includes a Reconfiguration ML IE that defines operating capabilities of at least one associated link. At block 904, the MLD exchanges frames according to the operating capabilities of the at least one associated link.

In some embodiments, the technique for ML reconfiguration may be implemented by a device (e.g., an AP MLD or a non-AP MLD). For example, a device may include a processor configured to generate an ML Configuration Action frame to change a number of active links while maintaining frame exchanges on at least one established link, where the ML Configuration frame includes a Reconfiguration ML IE that defines operating capabilities of at least one associated link, and exchange frames according to the operating capabilities of the at least one associated link.

In some embodiments, the technique for ML reconfiguration may be implemented by a system. For example, a system includes a first MLD (e.g., AP MLD), where the first MLD includes a processor configured to generate an ML Configuration Action frame to change a number of active links while maintaining frame exchanges on at least one established link, where the ML Configuration frame includes a Reconfiguration ML IE that defines operating capabilities of at least one associated link, and a radio configured to transmit the ML Configuration Action frame. In such an example, the system also includes a second MLD, where the second MLD includes another radio configured to receive the ML Configuration action frame.

Figure 10:
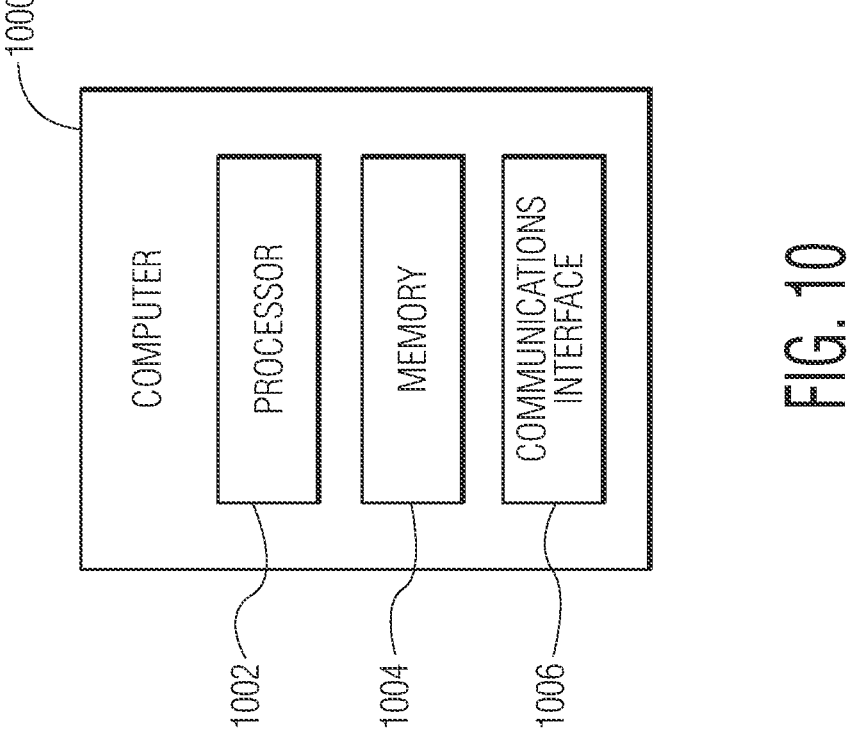
FIG. 10 depicts an example of a computer that can implement the technique for ML reconfiguration as described herein with reference to FIG. 9.

In an embodiment, the above-described functionality is performed at least in part by a computer or computers, which executes computer readable instructions. FIG. 10 depicts an example of a computer 1000 that can implement the technique for ML reconfiguration as described herein with reference to FIG. 9. As shown, the computer 1000 includes a processor 1002, a memory 1004, and a communications interface 1006. The processor may include a multifunction processor and/or an application-specific processor. As an example, the processor could be a CPU (with software), an application-specific integrated circuit (ASIC), a transceiver, a radio, or a combination thereof. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above. As an example, the computer 1000 may represent a first device (e.g., an AP MLD) and/or a second device (e.g., a non-AP MLD).

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, an RAM, an ROM, a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising: a processor configured to:
generate a Multi-Link (ML) Configuration Action frame to change a number of active links while maintaining frame exchanges on at least one established link,
wherein the ML Configuration frame includes a Reconfiguration ML Information Element (IE) that defines operating capabilities of at least one associated link; and
exchange frames according to the operating capabilities of the at least one associated link.

2. The device of claim 1, wherein the ML Configuration Action frame is transmitted to a Multi-Link Device (MLD), and wherein the device and the MLD negotiate the number of active links.

3. The device of claim 1, wherein the Reconfiguration ML IE includes a Common Info field that indicates a field that describes a total number of simultaneous active links if the number of simultaneous active links changes.

4. The device of claim 1, wherein the Reconfiguration ML IE includes a Per Link Info field of an added link, and wherein a non-Simultaneous Transmit and Receive (NSTR) Bitmap indicates whether the added link and the at least one established link are an NSTR pair.

5. The device of claim 1, wherein the Reconfiguration ML IE includes a Per Link Info field of the at least one established link, and wherein an NSTR Bitmap indicates whether the at least one established link and another link are an NSTR pair.

6. The device of claim 1, wherein the number of active links decreases, and wherein a Link Identification (ID) value of the at least one established link is not changed if a link with a smaller Link ID value is at least one of removed and disabled.

7. The device of claim 1, wherein the number of active links increases, and wherein a Link ID value of an added link is a smallest Link ID value that has not been allocated by the device.

8. The device of claim 1, wherein the Reconfiguration ML IE includes a Common Info field with at least one of an enhanced ML Single-Radio (eMLSR) capability announcement and an enhanced ML Multi-Radio (eMLMR) capability announcement.

9. The device of claim 8, wherein at least one of the enhanced eMLSR capability announcement and the enhanced eMLMR capability announcement indicate at least one of: links that support at least one of an eMLSR mode and an eMLMR mode; a delay time of a radio switch;

an Extremely High Throughput (EHT) Modulation and Coding Scheme (MCS) (EHT-MCS) supported by at least one of the eMLSR mode and the eMLMR mode; and a Number of spatial streams (Nss) supported by at least one of the eMLSR mode and the eMLMR mode.

10. The device of claim 1, wherein the number of active links decreases, and wherein the device announces disablement of a removed link for non-Access Point (non-AP) MLDs that do not support ML reconfiguration.

11. The device of claim 1, wherein the number of active links increases, and wherein the device announces enablement of an added link.

12. The device of claim 1, wherein the Reconfiguration ML IE includes a Max Basic Service Set Identifier (BSSID) (MaxBSSID) Indicator field; and wherein the device cannot add an Access Point (AP) in a link with a non-transmitted BSSID if the added AP increases a value of the MaxBSSID Indicator field.

13. The device of claim 1, wherein the Reconfiguration ML IE includes a MaxBSSID Indicator field; and wherein if the device adds an AP in a link with a non-transmitted BSSID that increases a value of the MaxBSSID Indicator field of a Multiple BSSID IE related to the non- transmitted BSSID, then another AP in another link affiliated with the device announces a Change Sequence for the link with the non-transmitted BSSID.

14. The device of claim 1, wherein the device includes an EHT AP that can announce a co-host AP set for at least one of a network allocation vector (NAV) operation and a spatial reuse operation.

15. The device of claim 1, wherein the Reconfiguration ML IE includes a Max Co-hosted BSSID Indicator field; and wherein the device cannot add an AP in a link with a BSSID if the added AP increases a value of the Max Co-hosted BSSID Indicator field.

16. The device of claim 1, wherein the Reconfiguration ML IE includes a Max Co-hosted BSSID Indicator field; and wherein if the device adds an AP in a link with a non-transmitted BSSID that increases a value of the Max Co-hosted BSSID Indicator field, then another AP in another link affiliated with the device announces a Change Sequence for the link with the non-transmitted BSSID.

17. The device of claim 1, wherein the number of active links increases, and wherein the Reconfiguration ML IE includes a field that indicates an added link.

18. The device of claim 1, wherein the number of active links decreases, and wherein the Reconfiguration ML IE includes a field that indicates at least one of a removed link and a disabled link.

19. A device comprising: a processor configured to:

generate a Multi-Link (ML) Configuration Action frame to change a number of active links while maintaining frame exchanges on at least one established link;

wherein the ML Configuration frame includes a Reconfiguration ML Information Element (IE) that defines operating capabilities of at least one associated link;

exchange frames according to the operating capabilities of the at least one associated link;

wherein the Reconfiguration ML IE includes a Per Link Info field of an added link or an established link; and wherein a non-Simultaneous Transmit and Receive (NSTR) Bitmap indicates whether, the added link and the at least one established link are an NSTR pair, or the established link and another link are an NSTR pair.

20. A device comprising: a processor configured to:

generate a Multi-Link (ML) Configuration Action frame to change a number of active links while maintaining frame exchanges on at least one established link, wherein the ML Configuration frame includes a Reconfiguration ML Information Element (IE) that defines operating capabilities of at least one associated link;

exchange frames according to the operating capabilities of the at least one associated link;

wherein the Reconfiguration ML IE includes a Common Info field with at least one of an enhanced ML Single-Radio (eMLSR) capability announcement and an enhanced ML Multi-Radio (eMLMR) capability announcement; and wherein at least one of the enhanced eMLSR capability announcement and the enhanced eMLMR capability announcement indicate at least one of: links that support at least one of an eMLSR mode and an eMLMR mode; a delay time of a radio switch; an Extremely High Throughput (EHT) Modulation and Coding Scheme (MCS) (EHT-MCS) supported by at least one of the eMLSR mode and the eMLMR mode; and a Number of spatial streams (Nss) supported by at least one of the eMLSR mode and the eMLMR mode.

* * * * *